(12) United States Patent
Wang et al.

(10) Patent No.: US 8,790,585 B2
(45) Date of Patent: Jul. 29, 2014

(54) COUNTERCURRENT TANK TYPE SUPERCRITICAL WATER REACTOR WITH A SACRIFICIAL LINING

(71) Applicant: Xi'an Jiaotong University, Xi'an (CN)

(72) Inventors: Shuzhong Wang, Xi'an (CN); Yanmeng Gong, Xi'an (CN); Honghe Ma, Xi'an (CN); Donghai Xu, Xi'an (CN); Jie Zhang, Xi'an (CN); Lu Zhou, Xi'an (CN)

(73) Assignee: Xi'an Jiaotong University, Xi'an (CN)

( * ) Notice: Subject to any disclaimer, the term of this patent is extended or adjusted under 35 U.S.C. 154(b) by 0 days.

(21) Appl. No.: 13/717,484

(22) Filed: Dec. 17, 2012

(65) Prior Publication Data

US 2013/0105378 A1    May 2, 2013

Related U.S. Application Data

(63) Continuation of application No. PCT/CN2011/078032, filed on Aug. 4, 2011.

(30) Foreign Application Priority Data

Oct. 15, 2010    (CN) .......................... 2010 1 0509811

(51) Int. Cl.
| | |
|---|---|
| *C02F 1/72* | (2006.01) |
| *C02F 1/02* | (2006.01) |
| *B01J 3/00* | (2006.01) |
| *B01J 8/02* | (2006.01) |
| *B01J 19/02* | (2006.01) |
| *C02F 1/00* | (2006.01) |
| *C02F 101/30* | (2006.01) |
| *C02F 11/08* | (2006.01) |
| *C02F 1/74* | (2006.01) |

(52) U.S. Cl.
CPC ............ *C02F 1/72* (2013.01); *B01J 2219/0002* (2013.01); *B01J 3/008* (2013.01); *C02F 2001/007* (2013.01); *B01J 8/0257* (2013.01); *B01J 2208/00495* (2013.01); *B01J 2219/0218* (2013.01); *C02F 1/725* (2013.01); *B01J 19/02* (2013.01); *C02F 2101/30* (2013.01); *C02F 11/086* (2013.01); *C02F 2301/066* (2013.01); *C02F 1/74* (2013.01); *B01J 2219/0236* (2013.01); *B01J 8/0278* (2013.01); *B01J 2219/0245* (2013.01)
USPC ............ 422/218; 422/241; 210/761; 210/205

(58) Field of Classification Search
USPC .......... 210/761, 762, 205, 209, 220; 422/218, 422/240, 241
See application file for complete search history.

(56) References Cited

U.S. PATENT DOCUMENTS 5,552,039 A * 9/1996 McBrayer et al. ............ 422/241
5,965,096 A * 10/1999 Djafer et al. .................. 210/762

(56) References Cited

FOREIGN PATENT DOCUMENTS

| CN | 2461918 Y | 11/2001 |
|---|---|---|
| CN | 101164912 A | 4/2008 |
| CN | 101570359 A | 11/2009 |
| CN | 101601985 A | 12/2009 |
| CN | 101973621 A | 2/2011 |
| JP | 10-314765 | 12/1998 |

OTHER PUBLICATIONS

International Search Report of International Application No. PCT/CN2011/078032, dated Aug. 4, 2011.

* cited by examiner

*Primary Examiner* — Lucas Stelling
(74) *Attorney, Agent, or Firm* — J.C. Patents

(57) ABSTRACT

A countercurrent tank type supercritical water reactor with a sacrificial lining, comprising a cylinder body and a catalyst tank arranged inside, the upper part of the cylinder body is connected with a top cover, and the lower part of the cylinder body is connected with a spherical head, the inner side of the cylinder body, the inner side of the spherical head and the inner side of the top cover constitute the inner wall of the reactor, wherein the inner wall of the reactor is provided with a high temperature resistance and thermal insulation coating layer, the inner wall of the high temperature resistance and thermal insulation coating layer is provided with a sealing coating layer, and the inner wall of the sealing coating layer is provided with the sacrificial lining. The reactor is of a countercurrent tank type, which can prevent the reactor blockage caused by salt deposition.

5 Claims, 1 Drawing Sheet

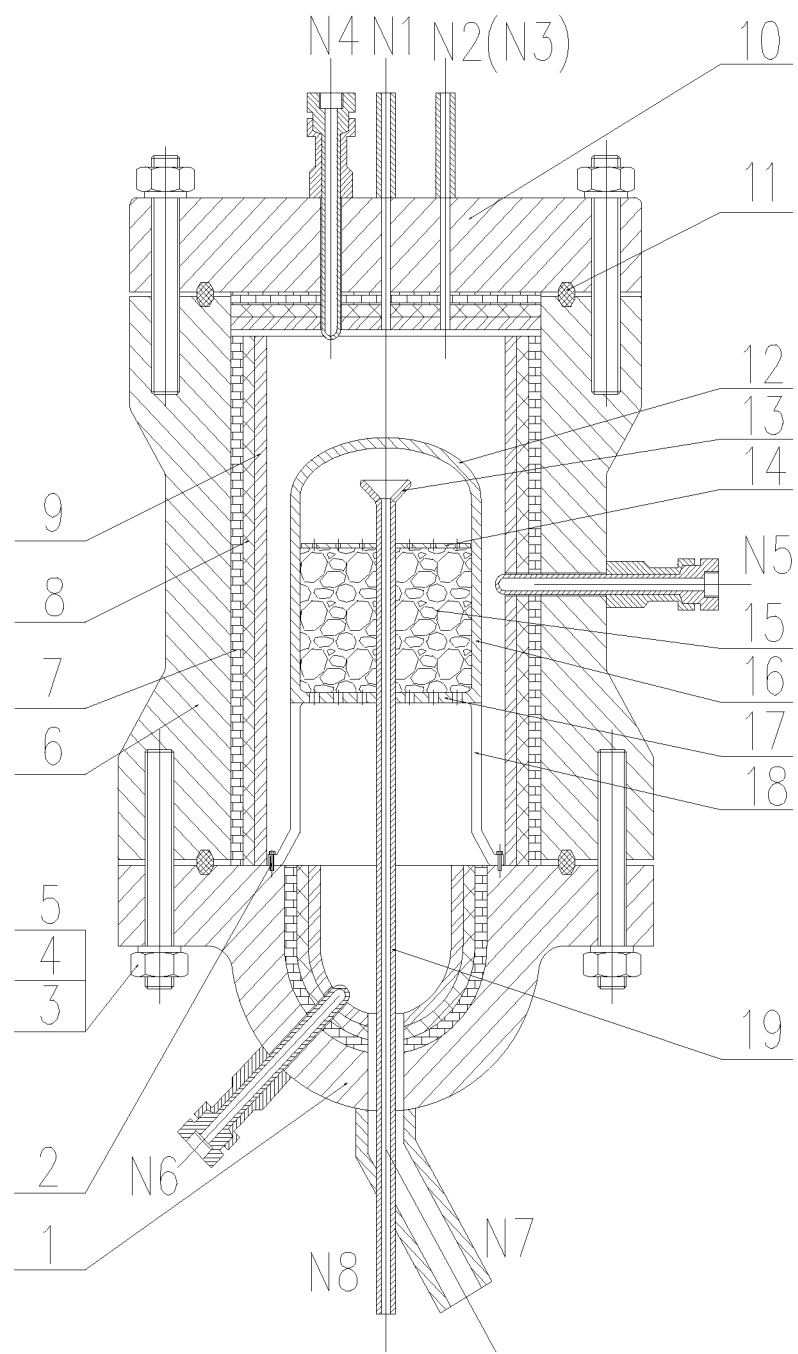

COUNTERCURRENT TANK TYPE SUPERCRITICAL WATER REACTOR WITH A SACRIFICIAL LINING

CROSS-REFERENCE TO RELATED APPLICATIONS

This application is a continuation of International Application No. PCT/CN2011/078032, filed on Aug. 4, 2011, which claims the priority benefit of China Patent Application No. 201010509811.6, filed on Oct. 15, 2010. The contents of the above identified applications are incorporated herein by reference in their entirety.

FIELD OF THE TECHNOLOGY

The present invention belongs to an environmental-protection device for water treatment, and particularly relates to a reactor which employs supercritical water as reactive medium to deal with unbiodegradable toxic organic wastewater.

BACKGROUND

Supercritical water (SCW) means the water in a special state that temperature and pressure are both higher than the critical points (T=374.15 DEG C, P=22.12 MPa). In this state, only a small amount of hydrogen bonds exist; the dielectric constant of the water approximates to that of an organic solvent; and the water has a high diffusion coefficient and low viscosity. Organic matter and oxygen can be dissolved in any proportion with the SCW converting heterogeneous reaction to homogeneous reaction, thereby reducing the resistance of mass transfer and heat transfer greatly. The solubility of inorganic matter, especially salts, is extremely low in the SCW, so that the inorganic matter can be separated easily.

The supercritical water treatment technology of organic wastewater comprises supercritical water oxidation (SCWO) technology, supercritical water gasification (SCWG) technology and supercritical water partial oxidation (SCWPO) technology.

SCWO makes use of the special features of water in a supercritical state to completely decompose organic matter through quick oxidation reaction of the organic matter and an oxidizing agent in the supercritical water, thereby realizing the harmless treatment on the organic matter. SCWG makes use of the special features of water in a supercritical state, wherein without an oxidizing agent, reactions such as hydrolysis and pyrolysis of the organic matter take place in the supercritical water to generate flammable gas which mainly comprises hydrogen. SCWPO makes use of the special features of water in a supercritical state to decompose the organic matter to generate flammable gas which mainly comprises hydrogen on the premise of providing partial oxidizing agent. Due to the addition of the oxidizing agent, the matter with decomposition difficulty in gasification previously can be decomposed so as to improve gasification rate. Meanwhile, the oxidizing agent inhibits the generation of tar so as to decrease the blockage of the reactor.

Although great progress has been made in supercritical water treatment technology, multiple problems in reactor design still remain to be solved, specifically:

1) The reaction conditions of SCWO, SCWG and SCWPO are rigorous, requiring higher temperature and pressure (the temperature is greater than 374.15 DEG C, and the pressure is greater than 22.12 MPa), so that the requirements on reactor material are high on one hand, and on the other hand, the reliability of the safe operation of the reactor is reduced. Currently, there exist transpiring wall reactors and water-cooled wall reactors, wherein by leading into a stream of cold fluid to isolate the bearing wall of the reactor and the high temperature fluid to achieve the purpose of separating the high-temperature area and the high-pressure area, thereby reducing the requirements on the reactor material and improving the reliability of the safe operation of the reactor, however, the two kinds of reactors have the defects of low energy utilization efficiency, complex control and others.

2) In the supercritical water environment, high temperature, high pressure, dissolved oxygen and some free radicals and ions generated in the reaction can accelerate the corrosion rate of corrosion-resistant material. Tests have proved that stainless steel, nickel-based alloys, titanium alloys and other high corrosion-resistant materials are subjected to corrosion in varying degrees in a supercritical water treatment system, especially in an SCWO system. The corrosion of the materials can lead to the decline of the service life of the reactor, resulting in safety accidents.

3) In the supercritical water oxidation treatment, the oxidation of ammonia nitrogen is more difficult. Due to the utilization of a catalyst in the supercritical water reaction, the conversion rate of the reactants including ammonia nitrogen can be obviously improved, the reaction time is shortened, and the reaction temperature and the reaction pressure are lowered. Presently, the loading and the replacement of the catalyst in a sealing reaction system are more difficult, and the problems such as the loss and inactivation of the catalyst still exist.

SUMMARY

The present invention aims at providing a novel supercritical water reactor, wherein the novel supercritical water reactor is widely applicable to harmless treatment and resource utilization of high-density organic wastewater with biochemical degradation difficulty.

In order to achieve the above mentioned purpose, the novel supercritical water reactor is realized by adopting the following technical solution:

A countercurrent tank type supercritical water reactor with a sacrificial lining, comprises a cylinder body and a catalyst tank arranged therein, the upper part of the cylinder body is connected with a top cover, and the lower part of the cylinder body is connected with a spherical head, the inner side of the cylinder body, the inner side of, the spherical head and the inner side of the top cover constitute the inner wall of the reactor, wherein the inner wall of the reactor is provided with a temperature resistance and thermal insulation coating layer, the inner wall of the temperature resistance and thermal insulation coating layer is provided with a sealing coating layer, and the inner wall of the sealing coating layer is provided with a sacrificial lining.

In the above technical solution, the catalyst tank comprises a tank body of the catalyst tank, wherein the upper end of the tank body of the catalyst tank is provided with a porous sealing cover and is sealed with an ellipsoidal head, and the lower end of the tank body of the catalyst tank is provided with a porous bottom cover; the whole catalyst tank is supported in the middle of the cylinder body of the reactor by a plurality of supporters surrounding the porous bottom cover; a central duct penetrates through the center of the catalyst tank, the upper end of the central duct is placed in the space formed between the porous sealing cover and the ellipsoidal head, and the lower end of the central duct penetrates through the spherical head and extends out of the reactor. The top part of the upper end of the central duct is provided with a bell mouth. The pore diameter of the porous bottom cover is larger than that of the porous sealing cover.

Compared with the prior art, the reactor of the present invention has the advantages that:

1. The inner wall of the reactor is painted with a temperature resistance and thermal insulation coating layer which can stand high temperature typically encountered in this kind of reaction systems and a sealing coating, due to the coordinated application of the two kinds of coating layers, the temperature of reactor wall is decreased, and meanwhile, the reactor wall is prevented from being corroded, and the range of options of the reactor material is enlarged, thereby eventually reducing the production cost of the reactor.

2. The reactor is of a countercurrent tank type structure, which can effectively prevent the reactor blockage caused by salt deposition. In addition, the catalyst tank is disassembled conveniently, and the installation and the replacement of the catalyst are simple.

3. In the present invention, different catalysts and carriers of the catalysts are added into the catalyst tank, which can achieve the multi-functionality (e.g. SCWO, SCWG and SCWPO) of the supercritical water treatment. Besides, depending on the differences of the reaction materials, different supercritical water treatment methods (SCWO, SCWG and SCWPO) can be further selected by adjusting the content of the oxidizing agent at an inlet (the oxidizing agent can be air, oxygen or others).

BRIEF DESCRIPTION OF THE DRAWINGS

The present invention is further described in details in combination with FIGURE and embodiments in the following.

FIG. 1 is a structural sectional view of the reactor in the present invention.

LISTS OF REFERENCE NUMERALS

1: spherical head of a reactor;
2: sunk screw;
3: nut;
4: gasket;
5: bolt;
6: cylinder body of the reactor;
7: high temperature resistance and thermal insulation coating layer;
8: sealing coating layer;
9: sacrificial lining;
10: top cover of the reactor;
11: octagonal gasket;
12: ellipsoidal head of the catalyst tank;
13: bell mouth;
14: sealing cover of the catalyst tank;
15: catalyst;
16: cylinder body of the catalyst tank;
17: bottom cover of the catalyst tank;
18: supporters of the catalyst tank;
19: central duct.
N1: water inlet;
N2: pressure gauge interface;
N3: safety valve interface;
N4: thermocouple interface of the top cover of the reactor;
N5: thermocouple interface of the cylinder body of the reactor;
N6: thermocouple interface of the bottom of the reactor;
N7: salt outlet;
N8: water outlet.

DETAILED DESCRIPTION

As shown in FIG. 1, a countercurrent tank type supercritical water reactor with a sacrificial lining comprises a cylinder body 6 and a catalyst tank arranged therein, the upper part of the cylinder body 6 is connected with a top cover 10, and the lower part of the cylinder body is connected with a spherical head 1, the inner side of the cylinder body, the inner side of the spherical head and the inner side of the top cover constitute the inner wall of the reactor, and the inner wall of the reactor is provided with a temperature resistance and thermal insulation coating layer 7; the inner wall of the high-temperature resistance and thermal insulation coating layer is provided with a sealing coating layer 8; and the inner wall of the sealing coating layer is provided with the sacrificial lining 9.

One of the characteristics of the reactor is to prevent the wall of the reactor from being corroded, which is described in details as follows:

1) The inner wall of the reactor, comprising the top cover 10, the cylinder body 6 and the spherical head 1, is applied with the temperature resistance and thermal insulation coating layer 7 and the sealing coating layer 8. The temperature resistance and thermal insulation coating is made of nano hollow ceramic microspheres and inorganic polymer; the applying thickness of the coating is 8 to 12 mm; and cross painting is adopted to guarantee the painting applying uniformity. In order to prevent the supercritical water from penetrating into the temperature resistance and thermal insulation coating layer to affect the thermal insulation effect due to the long-time contact of the temperature resistance and thermal insulation coating layer 7 and the supercritical water, the inner wall of the temperature resistance and thermal insulation coating layer 7 is painted with two sealing coating layers 8. The sealing coating consists of nano metal particles and inorganic polymer. The thermal insulation coating layer and the sealing coating layers are both high-temperature and high pressure resistant. Due to the coordinated application of the two coating layers, the temperature of the reactor wall is decreased, the wall of the reactor is prevented from being corroded, and the range of options of the reactor material is enlarged, thereby eventually reducing the production cost of the reactor.

2) The two kinds of layers 7 and 8 on the inner wall of the reactor are covered with the sacrificial lining 9 which can be made of materials such as stainless steel, nickel-based alloys, titanium and titanium alloys. In an embodiment, the sacrificial lining is made of stainless steel 316. The sacrificial lining 9 can cover the whole inner wall of the reactor to avoid the corrosion of the reactor due to the direct contact of the supercritical fluid and the inner wall of the reactor. The sacrificial lining 9 of the reactor can further alleviate corrosion of the interior of the reactor and save the manufacturing cost of the reactor. In order to avoid the safety problems caused by the corrosion of the inner wall of the reactor, the periodical replacement of the lining is needed. While the system is running, inorganic salt is inevitably deposited on the lining of the reactor; and therefore, the periodical replacement of the lining can effectively prevent reactor blockage caused by salt deposition as well.

The second characteristic of the reactor is to prevent the reactor blockage caused by salt deposition, which is described in details as follows:

1) The reactor in a countercurrent tank type structure overcomes the defect of blockage caused by salt deposition in tubular reactors. The tank body 16 of the catalyst tank is made of stainless steel 316 material. The total weight of the catalyst tank and the catalyst 15 is supported by eight supporters 18 and fixed by the sunk screw 2 on a flange at the bottom of the reactor. The bottom cover 17 and the sealing cover 14 of the catalyst tank are both porous plates, and the pore diameter of the bottom cover 14 is larger than that of the sealing cover 17, so that the reaction fluid can smoothly penetrate a catalyst bed, and the catalyst can be prevented from running away with the flow of the fluid. The top of the catalyst tank is sealed with the ellipsoidal head 12 which is in threaded connection with the catalyst tank (not shown in the FIGURE). The central duct 19 penetrates through the entire catalyst tank and the catalyst bed, the lower end of the central duct penetrates through the spherical head 1 and extends out of the reactor. The top end of the central duct 19 is provided with the bell mouth 13 which is in threaded connection with the central duct 19 (not shown in the FIGURE). The bell mouth 13 is used for fixing the sealing cover 17 of the catalyst tank and collecting post-reaction fluid.

The water containing organic matter is heated to a supercritical state before entering the reactor. By the brought-in heat and the reaction heat, the fluid in the reactor can be controlled at supercritical conditions, and at the moment, the inorganic salt in the materials is separated out in the reactor. Through gravity sedimentation and centrifugation, the inorganic salt is separated from the supercritical fluid. The fluid after desalination is baffled into the catalyst tank from bottom to top for the first time to carry out supercritical water catalytic reaction in the catalyst bed, and then is baffled out of the reactor for the second time through the bell mouth 13 at the top end of the central duct 19; the inorganic salt falls into the spherical head 1 of the reactor, and then is discharged out intermittently from a salt outlet N7, wherein the central duct 19 is sheathed in the salt outlet N7; the end-piece of the salt outlet N7 is bended; and the outlet of the central duct 19 extends out of the bent segment of the salt outlet N7. The innovation of the reactor in structure helps prevent reactor blockage caused by salt deposition and achieves the purpose of desalination before catalyst reaction, thereby reducing the deactivation rate of the catalyst.

The third characteristic of the reactor is to realize the multi-functionality of supercritical water treatment, which is described in details as follows:

1) The catalyst tank can be easily disassembled. When disassembling, the ellipsoidal head 12 of the catalyst tank is opened first, then, the bell mouth 13 of the central duct 19 is removed, and finally, the supporters 18 of the catalyst tank and the sunk screw 2 of the flange at the bottom of the reactor are screwed out. At this time, the catalyst tank can be removed from the upper part of the central duct 19, and the replacement of the catalyst can be carried out according to reaction requirements.

2) The installation and the replacement of the catalyst are simple.

By adding different catalysts and the carriers of the catalysts to the catalyst tank, the multi-functionality (e.g. SCWO, SCWG and SCWPO) of the supercritical water treatment can be achieved, and the flexible selection of harmless treatment and resource utilization processes can be carried out on the high-density organic wastewater with biochemical degradation difficulty. Depending on the differences of the materials, different supercritical water treatment methods (SCWO, SCWG and SCWPO) can be further selected by adjusting the content of the oxidizing agent at an inlet (the oxidizing agent can be air, oxygen or others), thereby realizing the purpose of conducting the harmless treatment and resource utilization processes on high-density organic wastewater with biochemical degradation difficulty.

What is claimed is:

1. A supercritical water reactor with a sacrificial lining, which has a countercurrent tank structure, comprising a cylinder body and a catalyst tank arranged therein, wherein an upper part of the cylinder body is connected with a top cover, and a lower part of the cylinder body is connected with a spherical head, and an inner side of the cylinder body, an inner side of the spherical head and an inner side of the top cover constitute an inner wall of the reactor, wherein the inner wall of the reactor is provided with a temperature resistance and thermal insulation coating layer, an inner wall of the temperature resistance and thermal insulation coating layer is provided with a sealing coating layer, and an inner wall of the sealing coating layer is provided with the sacrificial lining;

wherein the catalyst tank comprises a tank body of the catalyst tank, an upper end of the tank body of the catalyst tank is provided with a porous sealing cover which is sealed with an ellipsoidal head, and a lower end of the tank body of the catalyst tank is provided with a porous bottom cover; the catalyst tank is supported in the middle of the cylinder body of the reactor by a plurality of supporters surrounding the porous bottom cover; a central duct penetrates through the center of the catalyst tank, an upper end of the central duct is placed in a space formed between the porous sealing cover and the ellipsoidal head, and a lower end of the central duct penetrates through the spherical head and extends out of the reactor.

2. The supercritical water reactor with the sacrificial lining according to claim 1, wherein a top part of the upper end of the central duct is provided with a bell mouth.

3. The supercritical water reactor with the sacrificial lining according to claim 1, wherein pore diameter of the porous bottom cover is larger than that of the porous sealing cover.

4. The supercritical water reactor with the sacrificial lining according to claim 1, wherein the sealing coating layer consists of nano metal particles and inorganic polymer.

5. The supercritical water reactor with the sacrificial lining according to claim 1, wherein the central duct penetrates through the entire catalyst tank.

* * * * *